United States Patent

[11] 3,592,998

| [72] | Inventor | Raymond A. Derclaye<br>Couillet, Belgium |
|---|---|---|
| [21] | Appl. No. | 815,246 |
| [22] | Filed | Mar. 13, 1969 |
| [45] | Patented | July 13, 1971 |
| [73] | Assignee | Societe Metallurgique Hainaut-Sambre,<br>Societe Anonyme<br>Couillet, Belgium |
| [32] | Priority | Mar. 27, 1968 |
| [33] | | Belgium |
| [31] | | 712793 |

[54] PROCESS FOR RESISTANCE WELDING ELEMENTS HAVING DIFFERENT MASSES
15 Claims, 7 Drawing Figs.

[52] U.S. Cl..................................................... 219/117,
219/58
[51] Int. Cl..................................................... B23k 11/16
[50] Field of Search.......................................... 219/117,
101, 56, 10.71, 87, 58, 83

[56] References Cited
UNITED STATES PATENTS

| 1,228,032 | 5/1917 | Lachman..................... | 219/56 |
| 1,228,842 | 1/1916 | Sparkes........................ | 219/101 |
| 2,669,647 | 2/1954 | Segsworth.................... | 219/10.71 |
| 3,095,500 | 6/1963 | Jost............................. | 219/117 |

Primary Examiner—J. V. Truhe
Assistant Examiner—J. G. Smith
Attorney—Richards & Geier ABSTRACT: A process for resistance welding of elements having different masses, at least one of which, having a greater mass, is of naturally hard steel, includes the step of substantially subjecting, before the normal welding process, the element having the greater mass to a preheat treatment. The treatment is controlled such that, after the normal welding process, the cooling kinetics in the element having the greater mass has a value equal or lower than that of the element having the smaller mass, said kinetics being kept lower than the critical hardening rate.

INVENTOR.
R. A. Derclaye
BY
Richards y Geier
ATTORNEYS

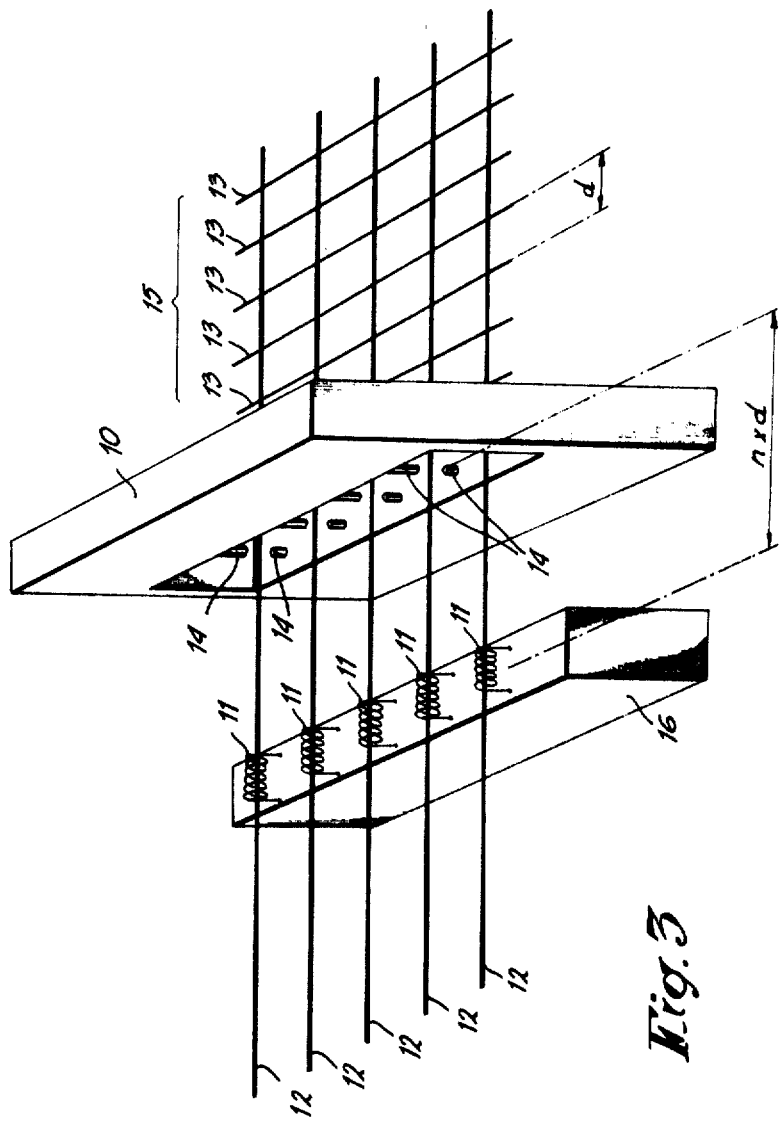

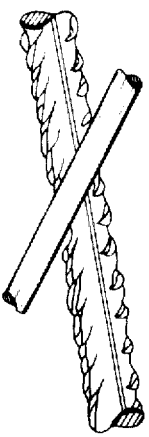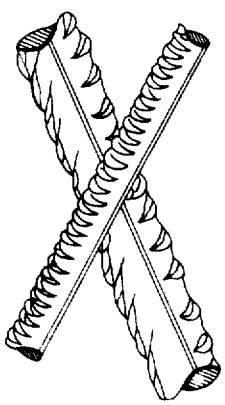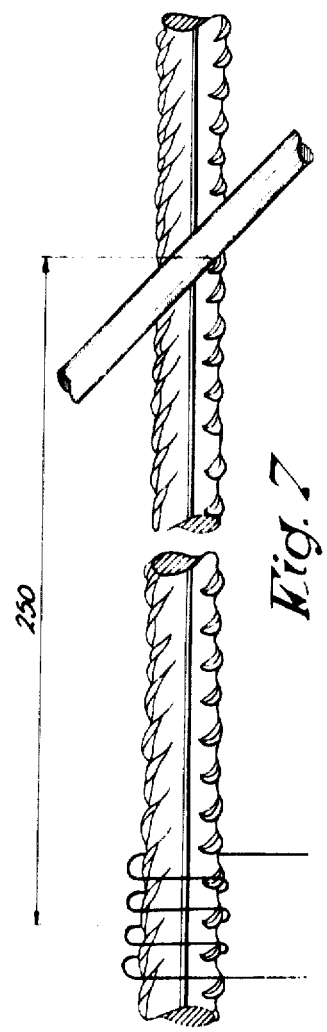

PROCESS FOR RESISTANCE WELDING ELEMENTS HAVING DIFFERENT MASSES

This invention concerns more particularly the problem of the welding of steel elements which, while having a high carbon content, have at least at right angles with the welding areas different masses or sections. This double condition is more and more required in the technics and the industry for premanufacturing any type of reinforcements, lattices and other metallic elements or structures applied for different purposes.

The processes and technical means known at present do not allow these manufacturing operations under acceptable conditions relating to safety, rapidity and economy. In fact, it is well known that the welding of high carbon steels makes the metal substantially more brittle. This drawback results from the fact that, after having been brought during the welding operation to a temperature higher than that of the austenitic transformation point, the steel is subjected to such cooling process that the critical hardening rate is exceeded, thereby forming brittle constituents having a weak ductility together with internal stresses and microcracks.

It may be readily observed that any increase of the carbon content does only increase this drawback.

Those skilled in the art know that the naturally hard concrete steels particularly charged with carbon, manganese and other hardening elements are particularly sensible thereto.

In addition, owing to its very principle, the resistance welding causes a very important and localized warming up of the parts being assembled, said warming up generating locally very high thermal gradients and cooling rates.

In this way, all the conditions are met to reach the critical hardening rates with the known consequences thereof. It results that the resistance welding of reinforcements in naturally hard steel for concrete works is at present considered as a difficult, delicate and inconvenient operation, particularly for welding rounds having different masses or sections.

Of course, attempts have been made to prevent the formation of brittle structures and microtracks during the resistance welding of such reinforcements with the view of preserving in the assembly a sufficient strength to the handlings and the utilization stresses.

A first-suggested means comprised welding bars with a current having a reduced intensity and maintained during a relatively long period. By reducing thereby the warming rate of the bars, a sufficient time is available for diffusing in the parts being interconnected an important portion of the calories evolved in the welding area, thereby reducing the thermal gradients.

Unfortunately, apart from the fact that this means, simple by itself, causes a very long welding time, particularly in the case of elements having a large diameter, it may be applied only for assembling bars having the same or approximately the same diameter.

In fact, in the case of bars or elements being assembled and having different transverse dimensions, the warming up of the element having the smaller section, limited by the crushing and overheating risks will be reached before the optimum warming up of the element having the greater section so that brittle structures are unavoidably found again in the latter after welding.

Another means comprises "stitch" welding by introducing through successive impulses a limited proportion of calories just sufficient to reach the warming up limit of the part having the smaller section. When this limit is reached, a stopping time is observed for absorbing a portion of the calories through the part having the greater section. The process is repeated until the optimum warming up is reached in the two parts being assembled.

Unfortunately, this process requires also very long welding times and it appears to be of a very delicate application. In fact any variation of the section of the products being assembled involves a new control of the intensity and a rearrangement of the interval and the number of cycles. Furthermore, the successive overheatings of the bars are likely to cause a substantial coalescence of the grain, thereby lowering the original ductility properties of the material.

Still another means comprises resistance welding by the conventional method adopted for instance for mild steel, whereupon attempts are made to restore the structure made brittle by a subsequent annealing treatment.

However, this means is only a last resource. In fact, while the annealing treatment allows to improve the structure, it is not capable of providing a complete regeneration of the areas embrittled by the passage of the current and it is still less capable of eliminating any microcrack resulting from internal stresses.

In numerous cases, the so-obtained assemblies will not meet the requirements of the specifications and more particularly the bending tests generally prescribed for evaluating the ductility thereof.

It has also been suggested to use, namely for welding sieves, electrodes having such a shape that the passage of the welding current induces a warming up promoting the bending of one element upon a second element before welding. However, in such process, the current passes through both elements being assembled, thereby causing unavoidably from the very beginning of the operation the formation of a welding lens with all the shortcomings known in the case of hard steels.

Finally, it has also already been suggested to apply a different heating program in structures of side members, said differences being determined by mass differences resulting e.g. from section differences of the two parallel longitudinal flanges of the side member. However, each of said heats considered individually concerns also the two elements being assembled and the purpose thereof is only to prevent substantial distortions of the whole side member after welding.

None of said means solves satisfactorily the problem of the resistance welding of elements of naturally hard steel and consequently of such elements having different masses.

An object of the present invention is to provide a process for conveniently and economically carrying out such weldings. This process comprises substantially bringing, when welding, the cooling kinetics in the element having the greater mass down to a value equal or lower than the cooling rate of the element having a smaller mass. This result is obtained by preheating the element having the greater mass in a treatment cycle prior to the welding cycle proper. In this way, when programming the conditions of the welding cycle to obtain, in the element of smaller mass, cooling conditions preventing the critical hardening rate being reached, the appearance of brittle structures will be thereby prevented in the two elements being assembled, it being difficult or impossible to regenerate such structures.

The differences in the mass of the elements being assembled by welding may result either from differences in the transverse dimensions or from differences in the compositions or simultaneously from both differentiation elements.

When welding elements having different compositions e.g. an element of naturally hard steel with an element of mild steel, the preheating of the element of hard steel according to the process of the invention allows to provide in the latter after welding cooling conditions preventing the critical hardening rate being reached.

According to the process of the invention, the preheating phase and the welding phase are either successive phases, with or without any dead time, or overlapping phases.

Thus, according to the invention, it is now possible, without any danger of embrittlement and in relatively very reduced periods, to carry out the resistance welding of elements having an equal or different section and an identical composition or a different one, when said elements have different masses at the location of the weld.

Similar or different means may be used for carrying out the two successive heating phases according to the process of the invention.

In a preferred embodiment of said process, the heating of the element having the greater mass will be obtained by Joule effect by means of electrodes or by an inductive effect. In this way, the moving welding clamps and the stationary monopoint or multipoint machines may be used for carrying out the process of the invention after having been provided with such preheating devices.

Another essential object of the invention relates to any means, device, tool and machine conditioned for carrying out the process disclosed herein, using a resistance, induction or similar preheating.

It is thus without any limitation that practical means and embodiments of the invention will be described hereafter with reference to the attached drawings in which:

FIG. 3 shows diagrammatically the application of an induction preheating device to a conventional machine for welding lattices;

FIGS. 4, 5, 6 and 7 show diagrammatically the elements forming the object of the practical embodiments described hereafter.

The means using the resistance preheating will be generally conditioned so that the preheating operation is effected through the intermediary of electrodes directly contacting the element having the greater mass. According to the invention, said electrodes may also be used for the following welding cycle.

Figure 1:
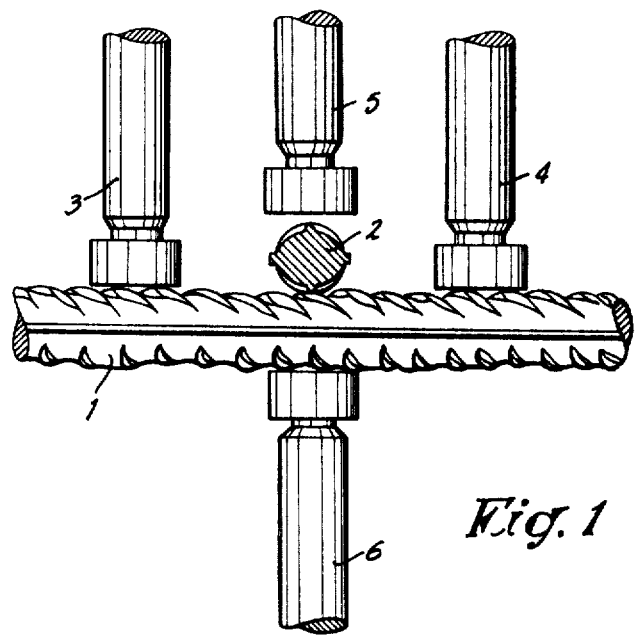
FIGS. 1 and 2 show as diagrammatically as possible the resistance welding devices according to the invention.

In the embodiment shown on FIG. 1, the element having the greater mass is indicated at 1 and the element having a smaller mass is indicated at 2. The electrodes 3-4 are preheating the element having the greater mass 1; the electrode 5 is used only for welding and the electrode 6 is used both during the preheating phase and the successive welding phase.

In the relative position of the elements being welded and the electrodes as shown on FIG. 1, the device is represented in the preheating phase of the element having the greater mass 1. This preheating is obtained by the passage of the current between the electrodes 3-4, on one hand, and the electrode 6, on the other hand, through the element having the greater mass 1 being welded. In that phase, the electrode 5 is secured in the retracted position, i.e. without any contact with the elements being welded.

After the preheating phase, the electrodes 3-4 are raised, the electrode 5 being lowered into contact with element 2 and the welding current is passed between electrodes 5-6 through elements 1-2.

Figure 2:
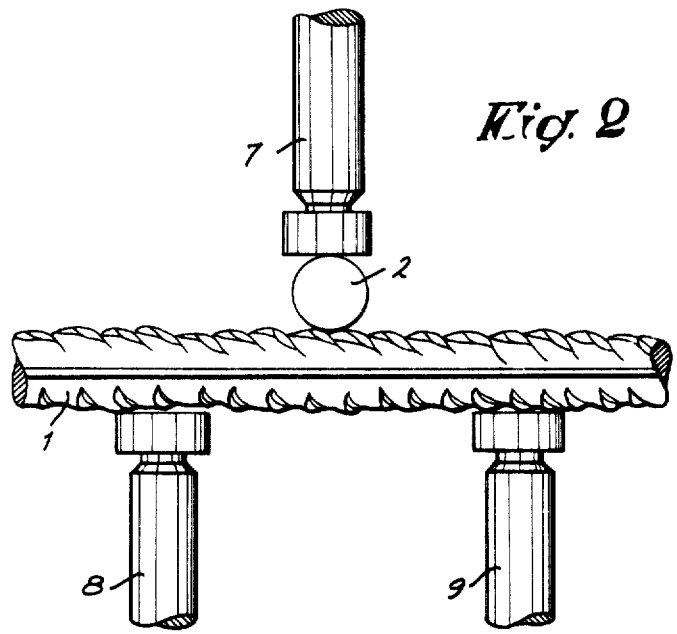

FIG. 2 shows diagrammatically another embodiment using only three electrodes 7, 8 and 9.

This device is additionally characterized in that said electrodes are kept stationary during the entire welding operation according to the process of the invention. In fact, both electrodes 8-9 are switched on during the preheating phase. When the optimum temperature is reached in element 1 having the greater mass, the welding phase is carried out by passing current between electrode 7, on one hand, and the two electrodes 8-9 or one of them, on the other hand.

It will be sufficient to previously and individually program for each cycle operating parameters such as time, intensity and pressure in accordance with the sections and the natures of the parts being assembled.

It will be also possible to use numerous other devices allowing a preheating according to the invention for welding any type of parts disposed in the same or different planes. It will be also possible to provide multielectrode equipments, namely for effecting simultaneously a more or less important number of welds for the manufacture of lattices, reinforcements, premanufactured beams and the like, it being possible for such equipments to form part of automatic or semiautomatic machines.

Figure 3 shows very diagrammatically the fitting of an induction preheating device according to the invention on a conventional machine for welding lattices. According to this embodiment, before the welding table 10 and in a parallel direction therewith, is disposed a line of coils 11 traversed by a high or mean frequency current, the longitudinal reinforcements 12 having generally a greater section passing through said coils.

The induction heating line is spaced from the welding line at a distance which is equal or higher than the length $d$ of the lattice meshes.

During the welding of a transverse bar 13 upon the sheet of longitudinal bars 12, a high or mean frequency current heats locally by induction each of the longitudinal bars at the desired temperature in points which, after scraping, will be situated at right angles with electrodes 14.

The operation is so continued mesh by mesh until the lattice 15 is completed.

The assembly of the induction heating coils is installed on a device 16 shifting them longitudinally and transversely for realizing meshes having any dimension.

A system for controlling the characteristics of the induction current allows to condition the preheating temperature at will.

This solution will appear particularly simple, practical and rapid, namely for the industrial construction of many lattice assemblies or for making welded panels, e.g. from concrete round of naturally hard steel either interconnected or assembled with cold-worked rounds having a high adherence or with smooth rounds in mild steel or with smooth, notched or impressed drawn wires.

Thus, the process and the technical equipment according to the invention may be conditioned in accordance with the craft or industrial manufactures independently from the mass differences between the elements being assembled by welding.

The following examples are only given to outline the rapidity, the convenience and the nature of the obtained results, said examples having no limitative character.

Examples 1, 2 and 3 are using the resistance preheating and example 4 uses the induction preheating.

Example 1 (FIG. 4):

Cross welding of two castellated rounds, both of naturally hard steel, the one having a diameter of 14 mm. and the other one, a diameter of 6 mm.

Characteristics of the preheating phase:
preheating time: 2.6 seconds
amperage at the primary (220v.): 250 a.
stress at the electrodes: 400 kg. or preferably 600 kg. if the clamp is equipped with a pressure control.
temperature reached in the bar of Φ 14 mm. at the end of the preheating phase: 680° C.

Characteristics of the welding phase:
welding time: 0.7 seconds
amperage at the primary (220 v.): 75 a.
stress at the electrodes: 400 kg.

Example 2 (FIG. 5):

Welding in the same place of two castellated rounds, both of naturally hard steel, the one having a diameter of 8 mm. bent on a mandrel having a diameter of 24 mm., the other having a diameter of 14 mm.

Characteristics of the preheating phase:
preheating time: 3.2 seconds
amperage at the primary (220 v.): 190 a.
stress at the electrodes: 600 kg.
temperature reached in the round of Φ 14 mm. at the end of the preheating phase: 690° C.

Characteristics of the welding phase:
welding time: 1 second
amperage at the primary (220 v.): 150 a.
stress at the electrodes: 600 kg.

Example 3 (FIG. 6):

Cross welding of a castellated round having a diameter of 10 mm. of naturally hard steel and a smooth round having a diameter of 6 mm. of mild steel.

Characteristics of the preheating phase:
preheating time: 1.2 seconds
amperage at the primary (220 v.): 190 a.
stress at the electrodes: 400 kg.

temperature reached in the round of Φ 10 mm. at the end of the preheating phase: 720° C.

Characteristics of the welding phase:

welding time: 0.3 seconds amperage at the primary (220 v.): 120 a.

stress at the electrodes: 400 kg.

Example 4 (FIG. 7):

Lattice the warp threads of which consist of castellated rounds having a diameter of 12 mm. of naturally hard steel, the weft threads consisting of smooth-drawn wires having a diameter of 7 mm. of mild steel. Dimension of meshes: 250 × 150 mm.

Characteristics of the preheating phase:

used power: 12 kw.

preheating time: 0.9 seconds temperature reached in the round having a diameter of 12 mm. at the end of the preheating phase: 710° C.

Characteristics of the welding phase:

welding time: 0.8 seconds amperage at the secondary (220 v.): 130 a.

stress at the electrodes: 400 kg.

The invention covers the process and devices such as previously described as well as any element, construction, portion of construction, assembly, mounting and as generally as possible, any element comprising welds realized by using the process according to the invention.

What I claim is:

1. A process for resistance welding of at least two elements having different masses, one of said elements having a greater mass and consisting of naturally hard steel, said process comprising the preliminary step of preheating the element having the greater mass and thereupon welding the two elements and cooling them, the improvement comprising controlling the preheating of the element having the greater mass such that the cooling kinetics in the element having the greater mass have a value at most equal to those of the element having the smaller mass, the kinetics being lower than the critical hardening rate.

2. A process according to the claim 1, characterized in that the different masses of the elements being assembled by welding result from differences in transverse dimensions.

3. A process according to claim 1, characterized in that the mass differences of the elements being assembled by welding result from differences in the nature or the composition.

4. A process according to claim 1, characterized in that the mass differences of the elements being assembled by welding result simultaneously from differences of transverse dimensions and differences in the nature or the composition.

5. A process according to claim 1, characterized in that the successive preheating and welding phases are effected without any interruption.

6. A process according to claim 1, characterized in that the successive preheating and welding phases are effected with interruption.

7. A process according to claim 1, characterized in that the welding phase is effected before the end of the preheating phase.

8. A process according to claim 1, characterized in that the successive preheating and welding phases are effected by resistance.

9. A process according to claim 1, characterized in that the preheating phase is effected by induction and the welding phase is effected by resistance.

10. A process according to claim 1, characterized in that the parts assembled by welding are in crossed position.

11. A process according to claim 1, characterized in that the welded parts are disposed in the same plane.

12. A process according to claim 1, characterized in that, in the same welding spot, one or several elements are assembled by welding with one or several other elements.

13. A process according to claim 1, characterized in that the elements being welded are castellated rounds of naturally hard steel.

14. A process according to claim 1, characterized in that one or several of the elements being welded are, on one hand, one or several castellated rounds of naturally hard steel and, on the other hand, one or several cold-worked rounds having a high adherence, or one or several smooth rounds of mild steel or one or several smooth, notched or impressed drawn wires.

15. A process according to claim 1, characterized in that the different elements being welded have at least partially different masses, it being possible to dispose the welding spots in the same plane or in different planes, the welding operations being effected individually or collectively.